United States Patent [19]

Reaney

[11] Patent Number: 5,523,890
[45] Date of Patent: Jun. 4, 1996

[54] VIDEO SCREEN MAGNIFIER FOR VIRTUAL REALITY AND GAME APPLICATIONS

[76] Inventor: Mark Reaney, 2513 Kensington Rd., Lawrence, Kans. 66046

[21] Appl. No.: 285,895

[22] Filed: Aug. 4, 1994

[51] Int. Cl.$^6$ .............................. G02B 27/02; G02B 7/02
[52] U.S. Cl. .................... 359/802; 359/804; 359/811; 359/819
[58] Field of Search ...................... 359/798, 799, 359/800, 801, 802, 803, 804, 805, 806, 807, 808, 809; 348/62, 63, 115; 345/8

[56] References Cited

U.S. PATENT DOCUMENTS

| | | | |
|---|---|---|---|
| 4,588,259 | 5/1986 | Sheiman | 359/465 |
| 4,712,870 | 12/1987 | Robinson | 395/811 |
| 4,802,756 | 2/1989 | Feinbloom | 351/200 |
| 4,991,935 | 2/1991 | Sakurai | 359/802 |
| 5,048,928 | 9/1991 | Davis | 359/809 |
| 5,061,052 | 10/1991 | DeJesus | 359/742 |
| 5,101,300 | 3/1992 | Hicks | 359/802 |
| 5,119,239 | 6/1992 | Iaquinto | 359/806 |
| 5,130,853 | 7/1992 | Sakurai | 359/803 |
| 5,157,430 | 10/1992 | Ogawa | 359/811 |
| 5,325,278 | 6/1994 | Tortola | 359/803 |

*Primary Examiner*—Georgia Y. Epps
*Assistant Examiner*—Ricky Mack

[57] ABSTRACT

A magnifying apparatus for use with a video display screen, such as a computer monitor or television set. A sheet magnifying lens is disposed in a housing adapted to be temporarily secured to the cabinet of the video display. The front of the housing incorporates special surfaces upon which the forehead of the user rests. The housing thereby maintains the proper interval between the video display screen, the magnifying lens, and the user. Disclosed are specifications of the housing, means of attachment to the video display and particular arrangements of lenses and a filter within the housing.

10 Claims, 4 Drawing Sheets

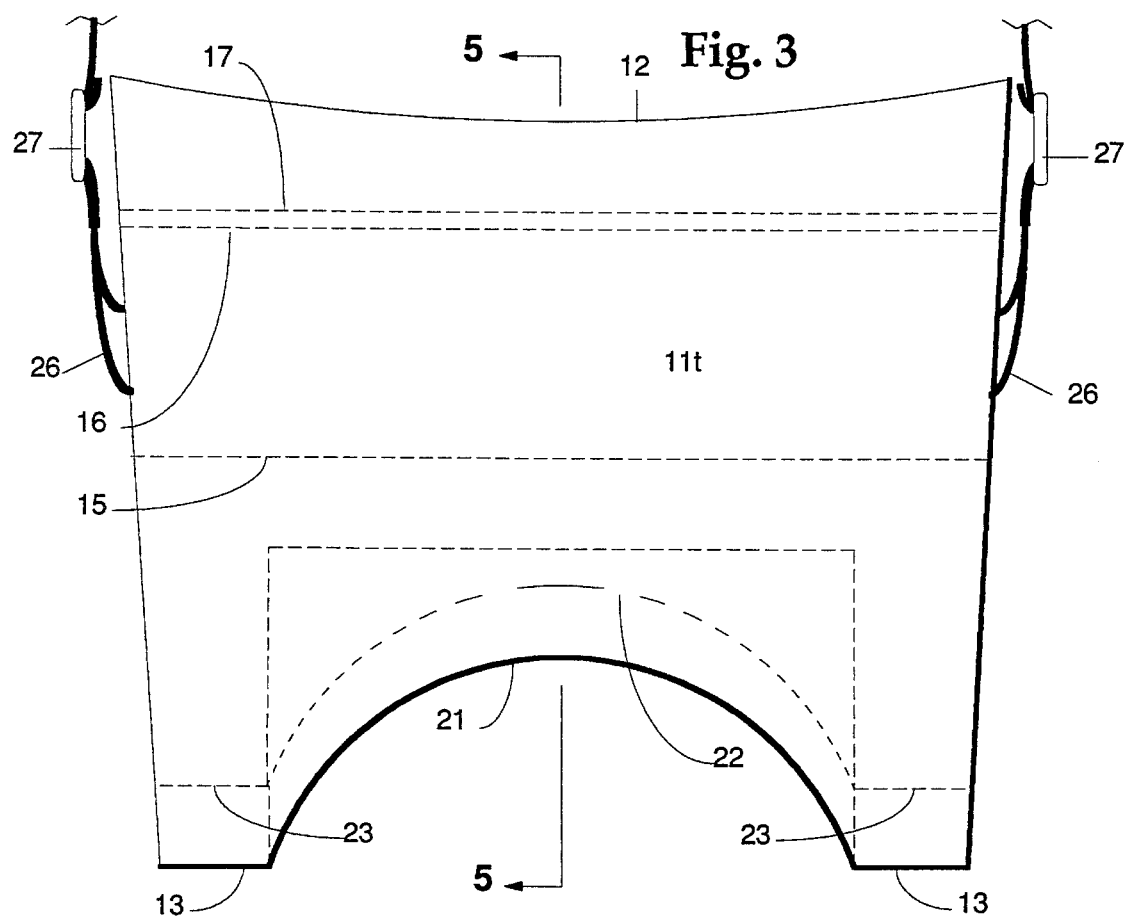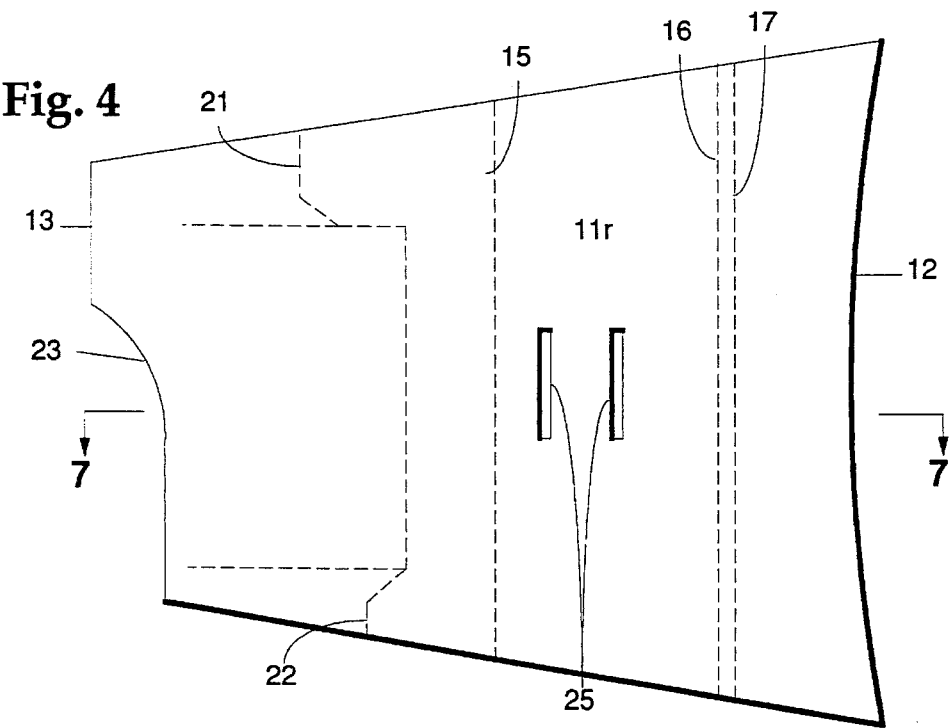

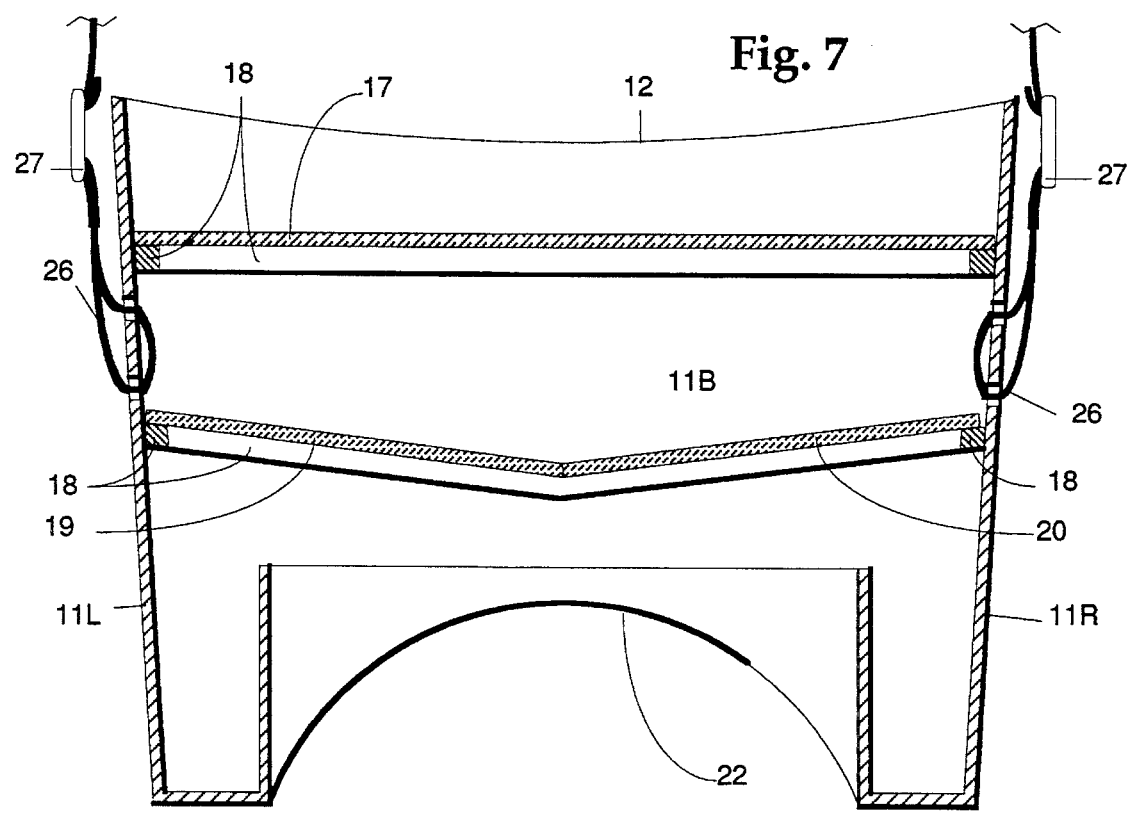

VIDEO SCREEN MAGNIFIER FOR VIRTUAL REALITY AND GAME APPLICATIONS

BACKGROUND OF THE INVENTION

1. Field of Invention

This invention relates to magnifying devices, specifically to magnifying devices used with video display screens such as those found in computer monitors and television sets.

2. Description of Prior Art

Much of the modern practice of creating and using interactive computer simulations, known as "virtual reality", relies on the users of such systems having a feeling of immersion within the computer generated worlds depicted on their display screens. This illusion is typically achieved by using devices that create a wide angle, or panoramic, view of the display screen. The present invention is one such device.

The most commonly used apparatus to achieve the illusion of visual immersion is the head-mounted display. These displays consist of one or two very small display screens mounted directly in front of the user's eyes. Special optics allow the user to focus on the screens positioned only inches from the eyes. These small displays are attached to a helmet or similar head gear that must be worn by the user. There are many disadvantages to such an apparatus. Among them are:

(a) Price—Two display screens with all of their supporting circuitry are very expensive. Prices for professional models can range from six or seven thousand to over one million dollars. Average consumer models typically cost about one thousand dollars, and new low-quality versions for use with electronic games still average approximately 300 dollars.

(b) Resolution—The small display screens used in head-mounted displays typically have a resolution less than one-third that of the typical television. This makes for an unacceptably grainy picture. One investigator noted that if one's eyesight had the same resolution as is found in a head-mounted display, that person would be classified as officially blind.

(c) Field of view—In order to keep the poor screen resolution of small displays from becoming totally unusable, most manufacturers of head-mounted displays compromise by not greatly magnifying the image. Most settle for an image with a 60 degree–70 degree horizontal field of view. Researchers generally agree that a field of view greater than 100 degrees is necessary to achieve an illusion of immersion.

(d) Weight—Two display screens with all of their supporting circuitry, helmet and mounting hardware are very heavy. Also, many models use added weights on the back of the helmet to counterbalance the weight of the displays. The result is a apparatus that tires the user, particularly in the muscles of the neck and shoulder. Also, the inertia that is built up in moving the head with a head mounted display from side to side can painfully wrench a user's neck.

(e) Ease of Use—Typical head-mounted displays systems pre-suppose an advanced level of expertise on the part of the user. Systems are difficult to set-up and maintain. Many are not readily compatible with common existing computers or television systems and require the purchase of additional intermediate hardware and software.

The use of magnifying devices with video display screens is shown in a number of patents. U.S. Pat. No. 5,119,239, U.S. Pat. No. 5,061,052, U.S. Pat. No. 5,048,928, U.S. Pat. No. 4,802,756 and U.S. Pat. No. 4,712,870 depict magnifying apparatuses to be used with video displays. However, all are designed and intended simply to make the video picture somewhat easier to see, and do not in any way posses the capability to create an illusion of immersion for the user.

SUMMARY OF THE INVENTION

This invention is an affordable, high-quality interface for use in the practice of virtual reality. Virtual reality technology is a new computer science wherein users are given the illusion that they are immersed within computer generated, fictive environments. Virtual reality simulations are used by architects and designers, in military and medical training, and in new immersive electronic games.

When connected to a video display screen, my invention magnifies the picture on that screen, filling the field of view of the user. Moreover, it creates a realistic illusion of greater distance between the user and the objects rendered on the screen. The main part of the invention, the housing, positions the magnifying lens or lenses, and the user's face in proper positions relative to the video display screen. Also, when constructed with opaque material, it provides the advantage of shutting out unwanted ambient light that causes distracting reflections and uncomfortable glare on the video display screen.

One alternative embodiment of my invention uses the same housing but a different lens configuration. This alternative configuration magnifies two side by side stereoscopic images and combines them into a single, three-dimensional picture.

Accordingly, several advantages of my invention are:

(a) Price—As my invention is made from inexpensive and commonly available parts, and since it is designed to use existing computer monitors and television sets, it is very inexpensive to make, own and operate. The cost to the user should be less than one-third that of the cheapest head-mounted display.

(b) Resolution—Because my invention uses a full size video display screen, it's resolution is at least three times better than that of the typical head-mounted display.

(c) Field of view—Again, because my invention uses a full size video display screen, and has high resolution, the resultant image has a horizontal field of view of approximately 110 degrees, sufficient to create a convincing visual illusion of immersion.

(d) Weight—Because my invention is not designed to be worn on the head, it's weight, though negligible in any case, is not a limiting factor.

(e) Ease of use—Designed to be used with existing computer monitors and television sets, my invention can be set-up in seconds by anyone of normal capacity. Further, it is intended to be used with existing virtual reality software, computer graphics and modeling software, computer game applications, and electronic game systems, such as the Nintendo Entertainment System™ and the Sega Genesis™ system.

In addition, like some of the previously mentioned patented devices, my invention has the capacity to serve as an aid for the visually impaired. Unlike those devices, because of it's wider field of view and it's ability to mask out unwanted sights, glare and reflection, my invention has the ability to serve as an ideal interface for virtual reality applications and interactive games.

Further objects and advantages of my invention will become apparent from a consideration of the drawings and ensuing description.

BRIEF DESCRIPTION OF THE DRAWINGS

FIG. 3 is a plan view of my invention.

FIG. 4 is a side elevational view of my invention, the elastic holding strap removed for reasons of clarity.

FIG. 7 is a plan sectional view taken on section line 7—7 of FIG. 4, but showing an alternate embodiment using two stereoscopic lenses.

List of Reference Numerals

10—The Housing
11—Sides of the Housing
12—Back of the Housing
13—Front of the Housing
15—Magnifying Lens
16—Second Magnifying Lens
17—Filter for Rays from the Visual Display Screen
18—Support Fillet
19—Left Lens for Stereoscopic Embodiment
20—Right Lens for Stereoscopic Embodiment
21—Forehead Rest
22—Cutout to Accommodate Lower Face
23—Cutout to Accommodate Ears
25—Slots for Elastic Strap
26—Elastic Strap
27—Buckle for Elastic Strap
28—Flange
29—VELCRO Tab

DESCRIPTION OF THE PREFERRED EMBODIMENTS

Figure 1:
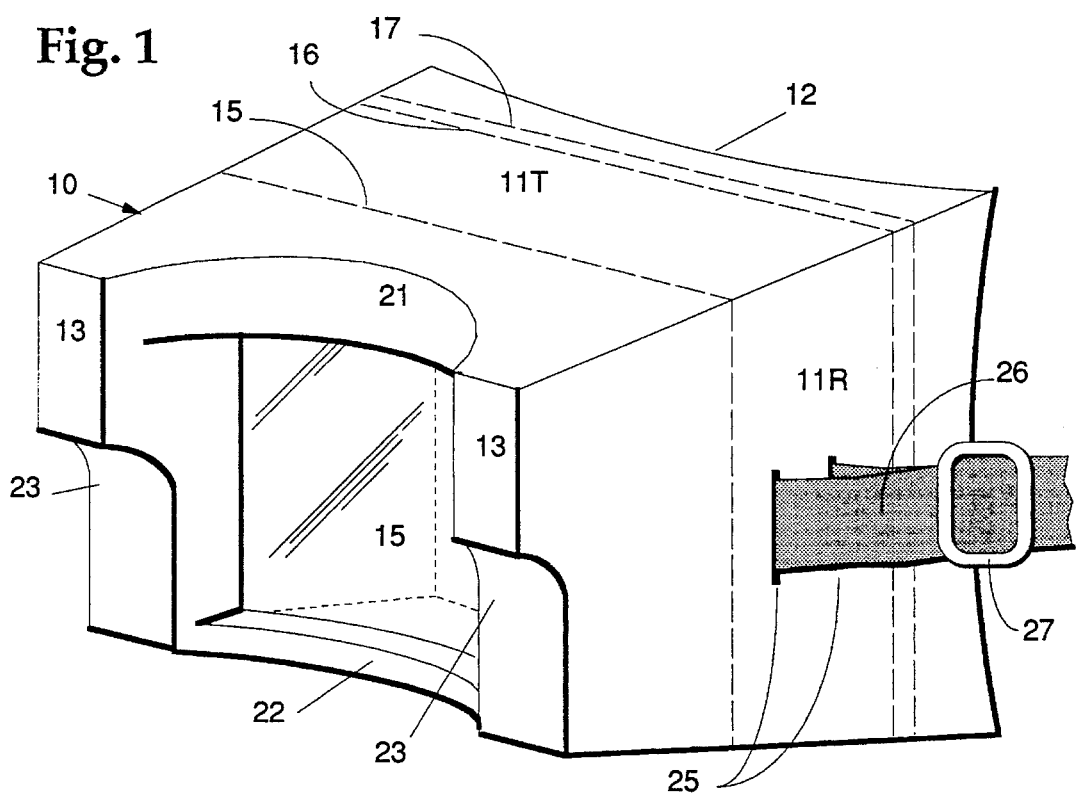
FIG. 1 is a perspective view of the preferred embodiment my invention.
Figure 2:
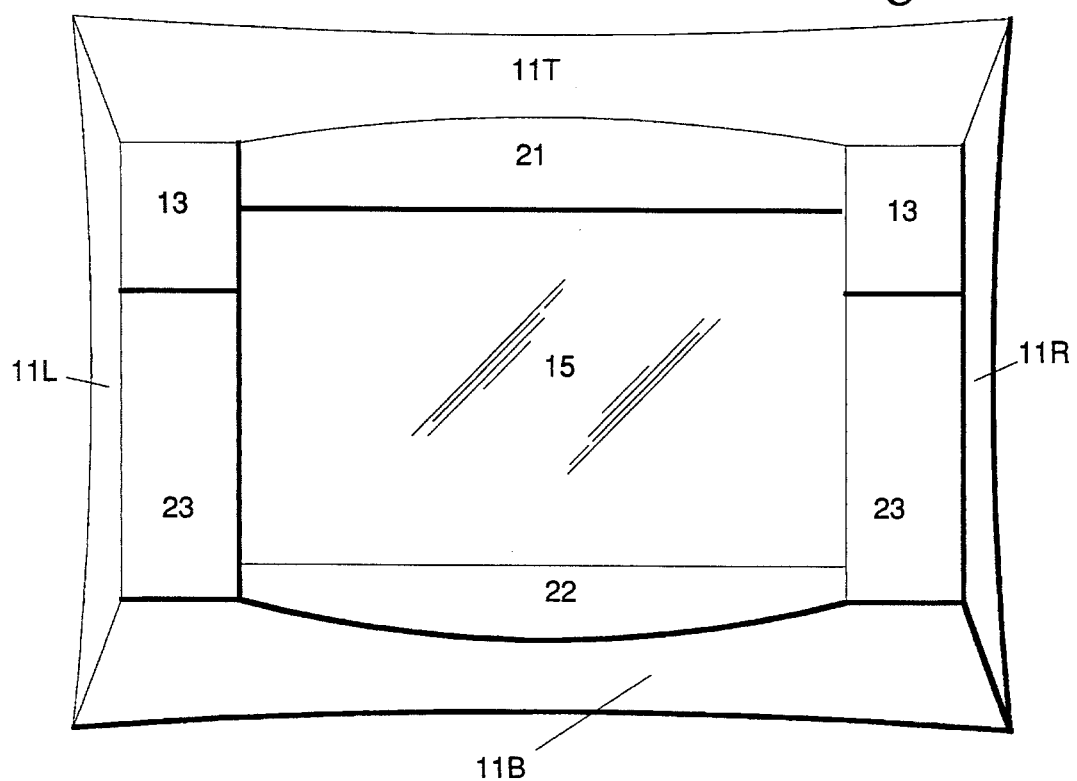
FIG. 2 is a front elevational view of my invention, the elastic holding straps at either side removed for reasons of clarity.

FIG. 1 shows an apparatus comprising a housing 10, a sheet magnifying lens 15, an elastic strap 26, and a buckle 27 attached to the strap 26. Housing 10 is opaque and has a front 13, a back 12, and sides 11. Back 12 of housing 10 fits against a video display screen and is open to admit light from the video display screen. The ends of sides 11 where they adjoin back 12 are cut back in a concave manner, away from the video display screen, so that back 12 of housing 10 may better fit against the typically outwardly curving video display screen. Right side 11R and left side 11L have two slots 25 each, that serve as anchor points for elastic strap 27. Front 13 is open in the center to admit light from the video display screen. The periphery of front 13 is a set of concave surfaces that comfortably engages the face of the user. The forehead rest 21, the ear cutout 23, and the lower face cutout 22 are specific of this type of concave surface. The ends of sides 11, where they meet front 13, are necessarily cut out to adjoin with the concave surfaces of front 13. Forehead rest 21 accurately positions the user's eyes at the correct angle and distance relative lens 15. Best results are obtained when the magnified image is slightly out of focus, thereby blurring together the pixels of the video display screen.

FIGS. 1 and 3 show elastic strap 26 used to hold housing 10 in place, with back 12 against the video display screen. One end of elastic strap 26 is looped through the two slots 25 in the right side 11R, and fastened with buckle 27. The other end of elastic strap 27 is looped through two slots 25 in the left side 11L and also fastened with buckle 27. Elastic strap 26 may then be pulled over the cabinet holding the video display screen and tightened by means of buckles 27. The resulting tension on elastic strap 26 holds housing 10 to the video display screen. The inevitable protruding surfaces of the cabinet around the periphery of the video display screen keep housing 10 from sliding off.

Figure 5:
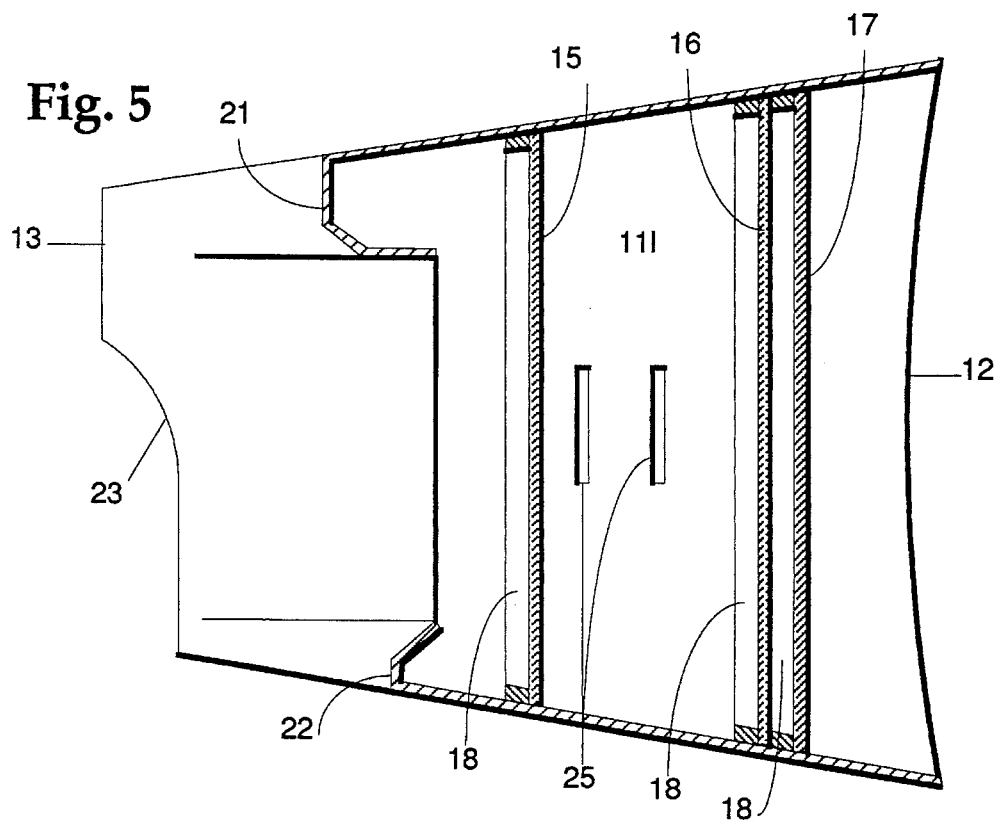
FIG. 5 is a side sectional view taken on section line 5—5 of FIG. 3, the elastic holding strap removed for reasons of clarity.

FIGS. 1, 3, 4, and 5 show the placement of sheet magnifying lens 15. Lens 15 is placed inside housing 10, generally parallel to the video display screen. There is some tolerance in the distance between lens 15, the user, and the video display screen. To reduce image distortion, lens 15 should be mounted with the convex, or ridged side, facing the video display screen. FIG. 5 shows a fillet 18 on the inside surface of sides 11, directly adjacent to the position of lens 15. Fillet 18 is used to better position lens 15 inside housing 10 and to afford a more positive attachment of lens 15 to housing 10.

FIGS. 1,3,4, and 5 show the location of two user optional features. The first of these is a second sheet magnifying lens 16. Second lens 16 is also positioned inside the housing 10, between and generally parallel to magnifying lens 15 and the video display screen. This lens should also be mounted with the convex or ridged side facing the video display screen. FIG. 5 shows a fillet 18 on the inside surface of sides 11, directly adjacent to the position of second lens 16. Fillet 18 is also used to better position second lens 16 inside housing 10 and to afford a more positive attachment of second lens 16 to housing 10. The second user optional feature is a filter 17 for rays emanating from the video display screen. This optional feature may be preferred by many users when the video display screen used is a cathode my tube. Unwanted emissions from this type of display are a source of concern for many people. FIG. 5 shows a fillet 18 on the inside surface of sides 11, directly adjacent to the position of filter 17. Fillet 18 is used to better position filter 17 inside housing 10 and to afford a more positive attachment of filter 17 to housing 10.

Figure 6:
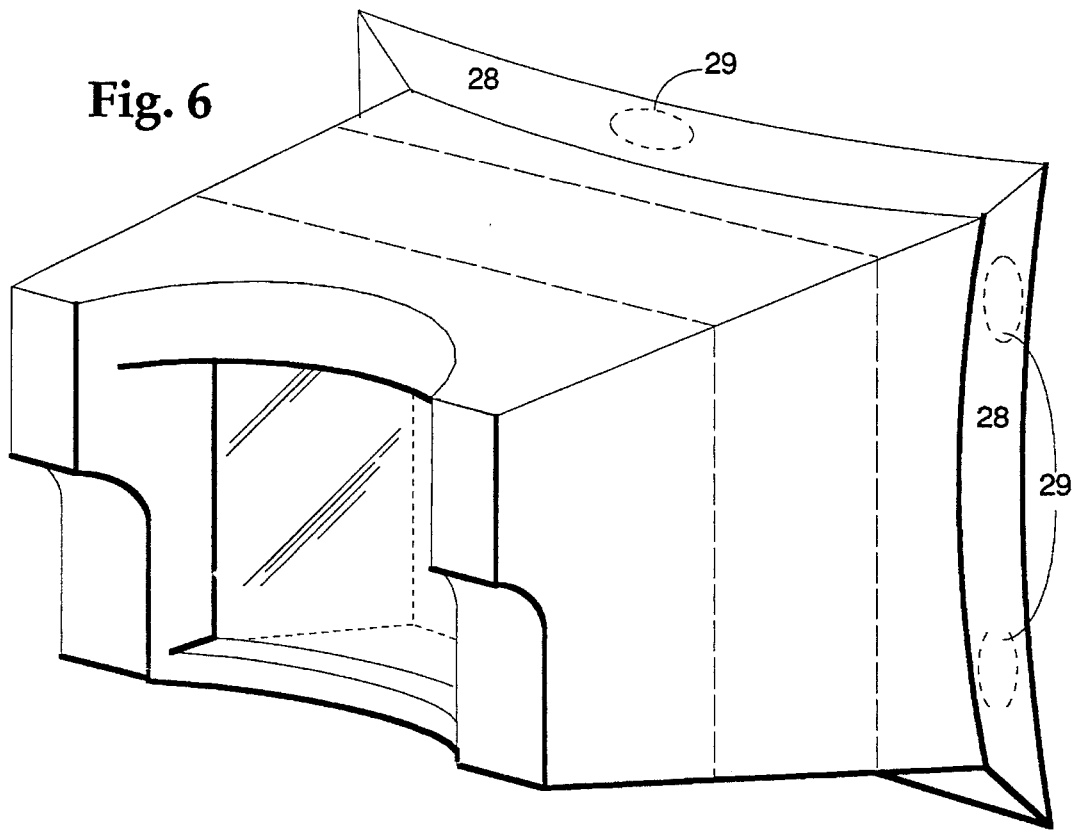
FIG. 6 is an alternative embodiment of my invention.

FIG. 6 shows an alterative embodiment of my invention. This embodiment is similar in all respects to the apparatus of FIG. 1, except that slots 25, elastic band 26, and buckle 27 are omitted. In their place, housing 10 is held in place by a flange 28 and VELCRO tabs 29. Flange 28 is attached to the ends of sides 11 where they adjoin back 12. Flange 28 extends outward from each side 11 in a direction generally perpendicular to that side 11 and parallel to the video display screen. VELCRO tabs 29 are permanently adhered to that side of flange 28 facing the video display screen. A mating VELCRO tab is adhered to the face of cabinet of the video display screen, opposite to tabs 29 on flange 28, with double-face pressure sensitive tape.

FIG. 7 is a plan sectional drawing showing another alternative embodiment of my invention. This embodiment is similar to the apparatus of FIG. 1 except that it is designed for use with stereoscopic images. Sheet magnifying lens 15 has been replaced by a left lens 19 and a right lens 20. Left lens 19 and fight lens 20 are mounted side by side in approximately the same plane as sheet magnifying lens 15 in FIG. 1. To reduce distortion, the outside vertical edges of left lens 19 and fight lens 20 should be moved slightly toward the Video display screen, thereby keeping the left lens 19 and right lens 20 more perfectly parallel with the outwardly curving surface of the video display screen. To best combine the stereo images, the optical centers of left lens 19 and right lens 20 should be a separated by a distance approximately equal to one-half the width of the video display screen. Flange 18 is again used to position and attach the lens 19 and lens 20.

The preferred embodiment of my invention is designed to create an illusion of immersion in interactive "virtual reality" computer models. Further, this invention can be used with interactive computer games and similar games played on home entertainment systems. "First person" games, those that put the user in the action, such as driving a race car or an airplane, benefit most from this invention.

Housing 10 is placed in position with back 12 against the video display screen. Elastic strap 26 is pulled over the cabinet containing the screen to hold housing 10 in place. The user then looks through the opening in front 13, resting the forehead against forehead rest 21. Using forehead rest 21 in this manner will generally align the user's line of sight in an appropriate manner with magnifying lens 15 and the video display screen. The resulting image will fill approximately 100–110 degrees of the user's horizontal field of view. Lens 15 will also allow the user's eyes to comfortably focus on the video display screen. In addition, lens 15 causes the lines of sight in each of the user's eyes to align nearly parallel to each other. Therefore, the resultant image will appear to be many feet distant from the user, usually enhancing the illusion of immersion within the virtual environment.

Housing 10 also blocks unwanted ambient light from the video display screen. Distracting reflections and glare are therefore eliminated.

When used with smaller images that do not fill the typical video display screen, second lens 16 can be inserted for increased magnification.

When used with the display screens of cathode ray tubes that the user may suspect emit harmful emissions, filter 17 can be inserted.

The operation of the embodiment shown in FIG. 6 is similar to that for FIGS. 1–5 except that elastic strap 26 is not used to hold housing 10 in place. Instead, flange 28 is pressed against the face of the cabinet containing the video display screen so that VELCRO tabs 29 engage their mates adhered to the cabinet frame.

The embodiment of FIG. 7 is intended for use with a video display screen on which is depicted a pair of side by side stereo images. The method of operation by the user is the same as in FIGS. 1–5. However, when viewing a pair of side by side stereo images through left lens 19 and right lens 20, the result is a magnified and optically combined three-dimensional image.

I claim:

1. A magnifier apparatus for use with a video display screen comprising:
    a) a magnifying lens,
    b) a housing having a front side, a rear side and a plurality of sides, said front side and said rear side being parallel to each other and open to allow light from said video display screen to pass through said rear side, said rear side covering said video display screen and positioned adjacent to said video display screen,
    said front side having an opening which allows a user to see through said front side and including positioning means to allow the face of said user to engage said front side in such a position that a fixed distance is maintained between said user's eyes and said magnifying lens,
    the line of sight from said user to said video display screen is perpendicular to said video display screen and passes perpindicularly through said magnifying lens, said front side and said rear side of said housing,
    said plurality of sides being perpendicular to said front side and said rear side and so positioned as to support said magnifying lens in a position that is between and parallel to said front side and said rear side;
    c) means for joining said magnifying lens to said housing at a location that is between and parallel to said front side and said rear side of said housing, and
    d) means for attaching said housing to said video display screen in such a position that said rear side is adjacent and parallel to said video display screen.

2. The magnifier apparatus of claim 1 wherein said plurality of sides are opaque.

3. The magnifier apparatus of claim 1, further including a second magnifying lens, said second magnifying lens positioned between said magnifying lens and said video display screen and parallel to said video display screen.

4. The magnifier apparatus of claim 1, further including a filter for rays emanating from said video display screen, said filter positioned within said housing and parallel to said video display screen.

5. A stereoscopic magnifier apparatus for use with video display screen comprising:
    a) two magnifying lenses, juxtaposed right and left, one to the other, with their respective optic centers spaced apart a distance that is equal to or greater than the distance between the centers of a user's eyes;
    b) a housing having a front side, a rear side and a plurality of sides, said front side and said rear side being parallel to each other and open to allow light from said video display screen to pass through said rear side, said rear side covering said video display screen and positioned adjacent to said video display screen,
    said front side having an opening which allows a user to see through said front side and including positioning means to allow the face of said user to engage said front side in such a position that a fixed distance is maintained between said user's eyes and said magnifying lens,
    the line of sight from said user to said video display screen is perpendicular to said video display screen and passes perpindicularly through said magnifying lens, said front side and said rear side of said housing,
    said plurality of sides being perpendicular to said front side and said rear side and so positioned as to support said magnifying lens in a position that is between and parallel to said front side and said rear side;
    c) means for joining said magnifying lens to said housing at a location that is between and parallel to said front side and said rear side of said housing, and
    d) means for attaching said housing to said video display screen in such a position that said rear side is adjacent and parallel to said video display screen.

6. The stereoscopic magnifier apparatus of claim 5 wherein said plurality of sides are opaque.

7. A magnifier apparatus for use with a video display screen comprising:
    a) a magnifying lens, b) a housing having a front side, a rear side and a plurality of sides, said front side and said rear side being optically transparent and parallel to each other, said rear side being of approximately the same dimensions as said video display screen, said plurality of sides being perpendicular and conjoining to said front side and said rear side and positioned as to support said magnifying lens in a position mesial and parallel to said front side and said rear side, c) means for engaging the face of a user with said front side of said housing in a position wherein the line of sight from said user through said magnifying lens to said video display screen is unobstructed and is aligned perpendicular to said video display screen and said magnifying lens, d) means for joining said magnifying lens to said housing at a location mesial and parallel to said front side and said rear side of said housing, and e) means for attaching said housing to said video display screen such a position that said rear side is in apposition to said video display.

8. The magnifier apparatus of claim 7 wherein said plurality of sides are opaque.

9. The magnifier apparatus of claim 7, further including a second magnifying lens, said second magnifying lens positioned mesial said magnifying lens and said video display screen and parallel to said video display screen.

10. The magnifier apparatus of claim 7, further including a filter for rays emanating from said video display screen, said filter spanning the inside of said housing and parallel to said video display screen.

* * * * *